United States Patent
Kalafala et al.

(10) Patent No.: US 9,600,617 B1
(45) Date of Patent: Mar. 21, 2017

(54) AUTOMATED TIMING ANALYSIS

(71) Applicant: International Business Machines Corporation, Armonk, NY (US)

(72) Inventors: Kerim Kalafala, Rhinebeck, NY (US); Natesan Venkateswaran, Hopewell Junction, NY (US); Chandramouli Visweswariah, Croton-on-Hudson, NY (US); Vladimir Zolotov, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/841,934

(22) Filed: Sep. 1, 2015

(51) Int. Cl.
G06F 9/455 (2006.01)
G06F 17/50 (2006.01)

(52) U.S. Cl.
CPC ...... *G06F 17/5045* (2013.01); *G06F 17/5031* (2013.01)

(58) Field of Classification Search
CPC .................................................. G06F 17/5031
USPC .......................................................... 716/113
See application file for complete search history.

(56) References Cited

U.S. PATENT DOCUMENTS

| | | | |
|---|---|---|---|
| 7,926,019 B1* | 4/2011 | Ravi ................... | G06F 17/5031 716/108 |
| 8,245,167 B1* | 8/2012 | e Silva ............... | G06F 17/5031 716/108 |
| 8,775,988 B2 | 7/2014 | Lavin et al. | |
| 2005/0066298 A1* | 3/2005 | Visweswariah ..... | G06F 17/5031 716/108 |
| 2007/0143722 A1* | 6/2007 | Venkateswaran ... | G06F 17/5031 716/108 |
| 2008/0216038 A1* | 9/2008 | Bose ................... | G06F 17/5072 716/118 |
| 2009/0055780 A1* | 2/2009 | Acar ................... | G06F 17/5031 716/132 |
| 2009/0100393 A1* | 4/2009 | Visweswariah ..... | G06F 17/5045 716/113 |

OTHER PUBLICATIONS

Hathaway, "A Brief History of Timing", Presentation, ACM International Workshop on Timing Issues in the Specification and Synthesis of Digital Systems (TAU), Feb. 2005, pp. 1-49, IBM Corporation, Armonk, NY.

* cited by examiner

*Primary Examiner* — Suresh Memula
(74) *Attorney, Agent, or Firm* — Brandon C. Kennedy; Steven Meyers; Kennedy Lenart Spraggins LLP (57) ABSTRACT

Improving automated timing analysis includes: generating a directed acyclic graph for an input netlist, generating a second order graph distance metric based at least on the directed acyclic graph, and scheduling a timing calculation for a set of nodes of the input netlist based at least on the second order graph distance metric.

15 Claims, 7 Drawing Sheets

AUTOMATED TIMING ANALYSIS

BACKGROUND

The present disclosure is generally related to data processing, or, more specifically, methods, apparatus, and products for improving automated timing analysis.

DESCRIPTION OF RELATED ART

As the complexity of modern electronic devices increases, so too does the complexity of the design tools used in creating those devices. For example, timing design tools make use of certain methods for abstracting a device design into models that may then be analyzed for compliance with desired performance metrics. However, as complexity of devices grows, so too does the complexity involved in this abstraction and analysis, slowing the design process and adding inefficiencies when portions of a design are changed.

SUMMARY

Improving automated timing analysis includes: generating a directed acyclic graph for an input netlist, generating a second order graph distance metric based at least on the directed acyclic graph, and scheduling a timing calculation for a set of nodes of the input netlist based at least on the second order graph distance metric.

The foregoing and other objects, features and advantages described herein will be apparent from the following more particular descriptions of example embodiments as illustrated in the accompanying drawings wherein like reference numbers generally represent like parts of example embodiments.

DETAILED DESCRIPTION OF EXAMPLE EMBODIMENTS

Figure 1:
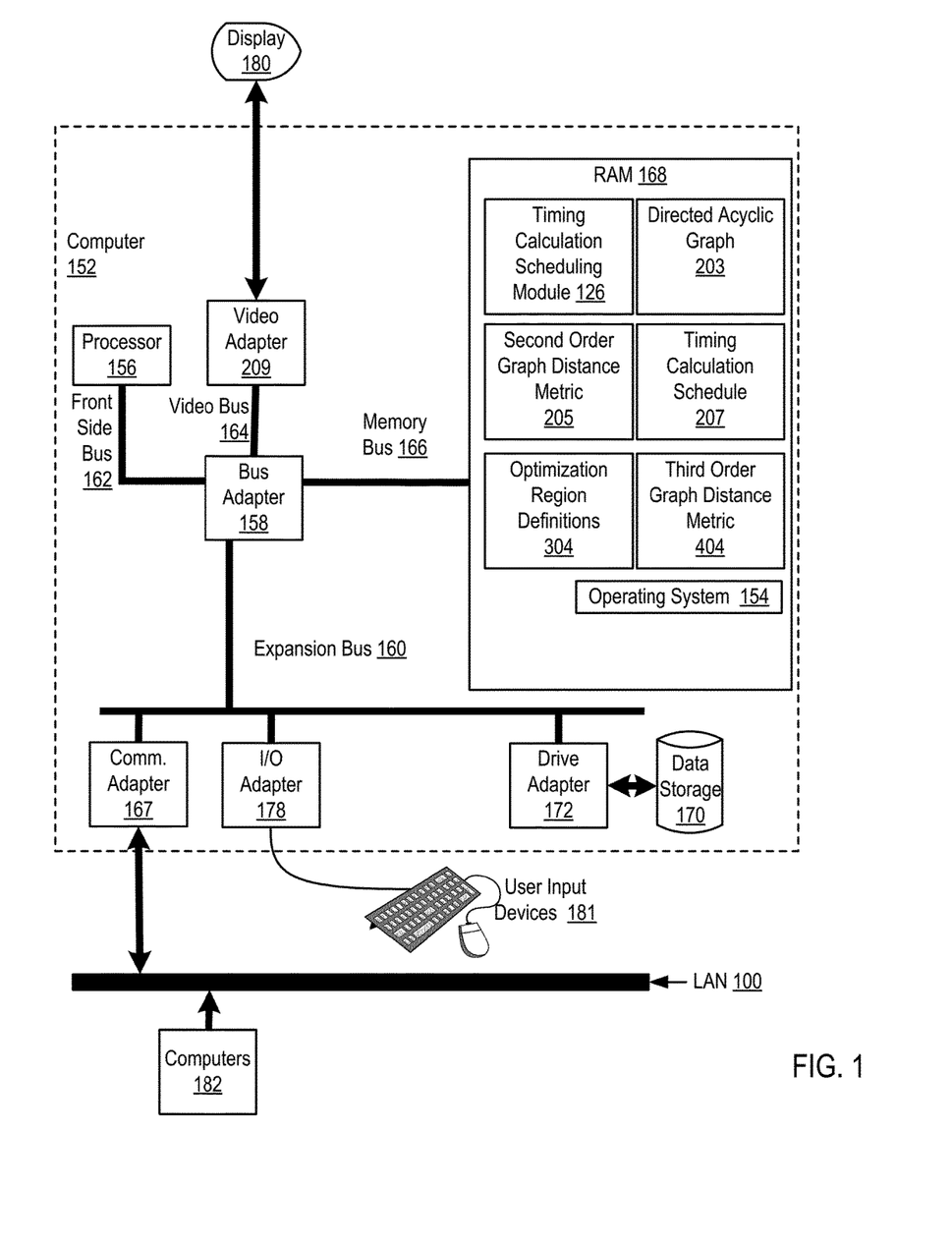
FIG. 1 sets forth a block diagram of automated computing machinery comprising an exemplary computer useful in improving automated timing analysis according to embodiments described herein.

Improving automated timing analysis, according to embodiments described herein, is generally implemented with computers, that is, with automated computing machinery. FIG. 1 sets forth a block diagram of automated computing machinery comprising an exemplary computer (152) useful in improving automated timing analysis according to embodiments described herein. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a timing calculation scheduling module (126), a module of computer program instructions for improving automated timing analysis. The module (126) of FIG. 1 may improve automated timing analysis by: generating a directed acyclic graph for an input netlist, generating a second order graph distance metric based at least on the directed acyclic graph, and scheduling a timing calculation for a set of nodes of the input netlist based at least on the second order graph distance metric, as described in greater detail below with reference to FIGS. 2-7.

Also stored in RAM (168) are various data elements and/or data structures operable to allow module (126) to improve automated timing analysis. As described in more detail below with reference to FIGS. 2-7, example data elements may include: directed acyclic graph (203), second order graph distance metric (205), timing calculation schedule (207), optimization region definitions (304), and/or third order graph distance metric (404). Each of these elements is described in more detail below with reference to FIGS. 2-7.

In some embodiments, example data elements and/or data structures may include further data elements and/or data structures. Further, although certain example data elements are illustrated in FIG. 1 to aid in understanding, additional data elements and/or data structures may be implemented in some embodiments without departing from the scope of the present disclosure. For example, as described in more detail below with reference to FIG. 4, third order graph distance metric (404) may be derived from other data such as directed acyclic graph (203) and/or second order graph distance metric (205).

Also stored in RAM (168) is an operating system (154). Operating systems useful for generating a contributor-based power abstract for a device according to embodiments described herein include UNIX™, Linux™, Microsoft XP™, AIX™, IBM's i5/oS™, and others as will occur to those of skill in the art. The operating system (154), and abstract generation module (126) in the example of FIG. 1 are shown in RAM (168), but many components of such software typically are stored in non-volatile memory also, such as, for example, on a disk drive (170).

The computer (152) of FIG. 1 also includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for generating a contributor-based power abstract for a device according to embodiments described herein include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (109), which is an example of an I/O adapter specially designed for graphic output to a display device (180) such as a display screen or computer monitor. Video adapter (109) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for generating a contributor-based power abstract for a device according to embodiments described herein include modems for wired dial-up communications, Ethernet (IEEE 802.3) adapters for wired data communications, and 802.11 adapters for wireless data communications.

Example computer (152) may implement certain instructions stored on RAM (168) for execution by processor (156) for improving automated timing analysis. In some embodiments, the improved automated timing analysis may be implemented as part of a larger set of executable instructions. For example, module (126) may be part of an automated timing analysis tool operable to test the timing characteristic of a particular circuit design. Validating the timing involved in digital circuit designs is an integral part of the design process. Certain known techniques involve the modeling and/or abstraction of a circuit design and subsequent analysis of the model's timing performance. However, these techniques face several limitations as the complexity of the modeled circuit increases. For example, as described in more detail below with reference to FIG. 2, in order to calculate important timing parameters for a particular node N, it may be necessary to calculate those timing parameters for every node prior to node N. This may result in unnecessary calculations (including associated resource costs), as well as difficulty in adapting the analysis to any subsequent changes in the circuit design.

Figure 2:
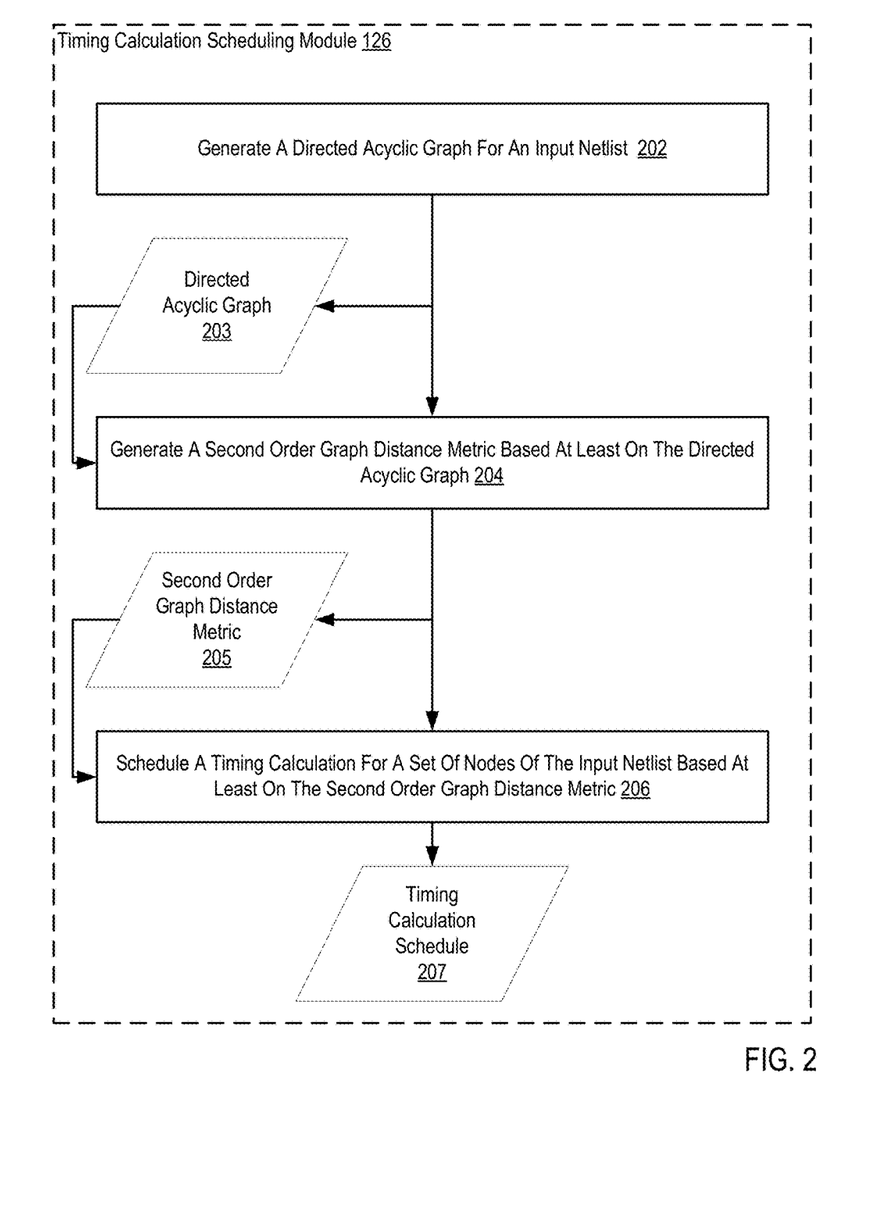
FIG. 2 sets forth a flow chart illustrating an exemplary method for improving automated timing analysis according to certain embodiments of the present disclosure.

For further explanation, FIG. 2 sets forth a flow chart illustrating an exemplary method for improving automated timing analysis according to certain embodiments of the present disclosure. The example method illustrated in FIG. 2 includes generating (202) a directed acyclic graph for an input netlist. A "directed acyclic graph," as the term is used in this disclosure, is any representation of some or all of the nodes of a netlist arranged in an acyclic manner to indicate the nature of the directed paths among the nodes. The term "acyclic," as it is used in this disclosure, refers to a graph that does not loop back. That is, all directive from a node point to a later node. Example directed acyclic graphs (500, 600, 700) are illustrated and described in more detail below with reference to FIGS. 5-7. In some embodiments, the generated directed acyclic graph (203) may be stored as one or more data elements and/or data structures in RAM (168) of example computer (152).

In order to perform timing analysis on directed acyclic graph (203), certain parameters associated with each node in directed acyclic graph (203) may be calculated. One such example parameter is known as an "arrival time level" or "AT level". The AT level at a particular node is a modeling characteristic for that particular node representing the scheduling order to accurately compute the actual time at which a signal will arrive at that node based on the model as a whole. Another such example parameter is known as "required arrival time level" or "RAT level." The RAT level at a particular node is a modeling characteristic for that particular node representing the scheduling order to accurately compute the time at which the signal needs to arrive at that node based on the circuit design requirements. The use of AT and RAT levels are described in more detail below with reference to FIGS. 3-7.

In some current timing analysis methods, in order to analyze the timing at node N it is necessary to compute the relevant timing parameters for each node prior to node N. For example, if an input netlist includes nodes $\{N_1, N_2, \ldots N_i\}$, then in order to compute, for example, the arrival time of a node at AT level $N_i$, the arrival time must be calculated for every node $\{N_1, N_2, \ldots N_{i-1}\}$ that is at a lower AT level than the node of AT level $N_i$. A similar list of calculations may be needed in order to know the required arrival time (RAT) for the node of RAT level $N_i$. However, as described in more detail below and with reference to FIGS. 3-7, relationships between nodes may be established via certain metrics. Those metrics may then be used in a timing analysis schedule in order to optimize the timing analysis, reducing resource waste and improving flexibility.

The example method illustrated in FIG. 2 also includes generating (204) a second order graph distance metric based at least on the directed acyclic graph. For the purposes of this disclosure, a "graph distance metric," is a defined, observed, calculated, or derived value indicating a relationship between one node of a netlist and another node of a netlist. For example, the distance between one node and another node may be a graph distance metric. In this example, the distance between one node and another node may be described as a "first order" graph distance metric.

For example, as illustrated in more detail below with reference to FIG. 6, for an example directed acyclic graph with a source node denoted as "S," a target node denoted as "T," and a sink node denoted as "F," a first order graph distance metric may be the maximum distance from S to T (denoted as "d(S,T)") or the maximum distance from F to T (denoted as "d(F,T)"). "AT level" and "RAT level" are two conventional first order graph distance metrics that make use of these distance metrics. For example, one definition of AT level (a metric associated with arrival times) is the maximum distance from S to T. One definition of RAT level (a metric associated with required arrival times) is the maximum distance from F to T.

In some embodiments, a directed acyclic graph will include a plurality of nodes between a source and a sink. As illustrated in the example directed acyclic graph of FIG. 6, a second target node between S and F may be denoted as "Q." Q may also have associated first order graph distance metrics. The first order graph distance metrics of various nodes may then be used in some traditional timing analysis.

For example, the AT levels and RAT levels may be used to determine if one node depends on another node. If the maximum distance from S to T is less than or equal to the maximum distance from S to Q (e.g., AT level (T)<=AT level (Q)), then T cannot "depend" on Q. That is, Q is not on the most direct path from T to F. Analogously, if the maximum distance from F to T is greater than or equal to the maximum distance from F to Q (e.g., RAT level (T)>=RAT level (Q)), then T cannot depend on Q.

A second order graph distance metric is one that is calculated and/or derived from a first order graph distance metric. For example, as described in more detail below and with reference to FIGS. 3-7, a second order graph distance metric may be derived from a first order graph distance metric, as described in more detail below.

In some embodiments, a second order graph distance metric may indicate a "slack," or a difference between constraints on one node from various other nodes. For example, an AT level slack may indicate a difference in the AT levels associated with a plurality of nodes incoming at a target node. As illustrated below with reference to FIG. 5, a node "X" may have two incoming paths: one from node "A" and one from node "B." Each of these nodes may have an associated AT level. In the following description, "AT level" may refer to a varied or assumed AT level for timing analysis.

Figure 5:
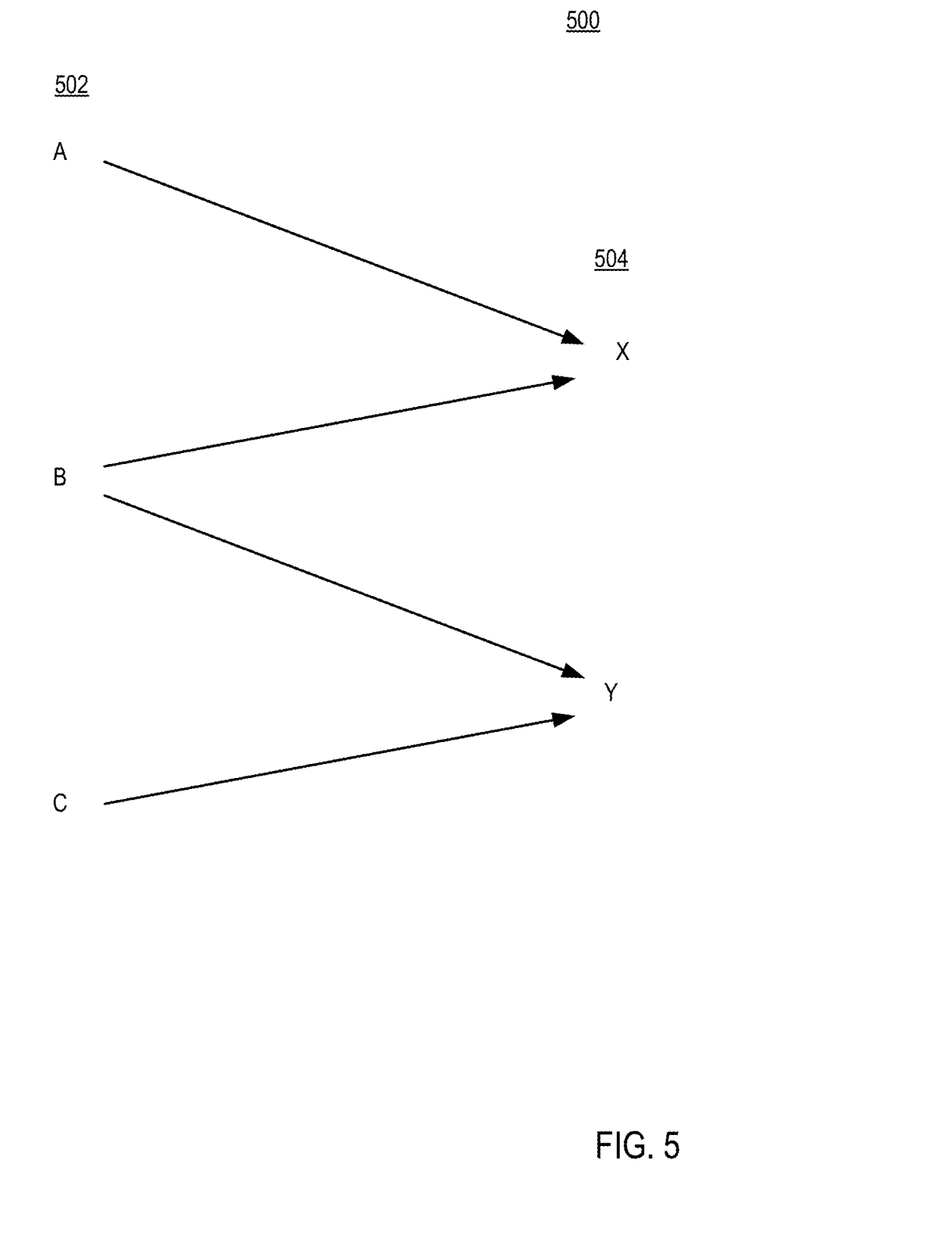
FIG. 5 illustrates an example directed acyclic graph, in accordance with certain embodiments of the present disclosure.

Each edge, therefore, may have an associated AT level "slack." This may be defined to be the AT level at the end node (e.g., node X) less the AT level at the beginning node (e.g., node A) plus 1 to indicate the AT level slack on the edge from A to X. Formula 1 below illustrates this relationship.

$$AT\ LevelSlack_{EDGE}(A,X) = ATLevel(X) - \{ATLevel(A) + 1\} \quad \text{Formula 1}$$

The AT level slack at a node may then be determined from the AT level slack of all outgoing edges from a node. Referring to the example used above, node B has two outgoing paths, one to node X and one from to node Y. The AT level slack at node B may then be the minimum of the AT level slack for the edges for all outgoing paths plus 1, as illustrated in Formula 2 below.

$$ATLevelSlack_{NODE}(B) = MIN(ATLevelSlack_{EDGE}(B,X), ATLevelSlack_{EDGE}(B,Y)) \quad \text{Formula 2}$$

That is, by comparing the AT level slack at different nodes, it may be possible to determine which node will require more effort to analyze the associated timing. For example, since timing at a node is analyzed first by analyzing the timing for all predecessor nodes and only then moving on to a node of interest, then the analysis for one node may be unnecessarily delayed while the analysis is run for another node with greater predecessor requirements.

The above are intended solely as illustrative examples of first- and second order graph distance metrics. As described in more detail below with reference to FIGS. 3-7, other graph distance metrics may be constructed without departing from the scope of the present disclosure. Further, the graph distance metrics described above may be calculated and/or derived in different ways without departing from the scope of the present disclosure. Further order graph distance metrics are also available. For example, a third order graph distance metric would be calculated and/or derived from a second order graph distance metric, a fourth order graph distance metric from a third order graph distance metric, etc.

In some embodiments, as described in more detail below with reference to FIGS. 3-7, a second order graph distance metric may also be calculated and/or derived from one or more first order graph distance metrics. For example, it may be advantageous for a timing analysis tool to abstract a netlist into a directed acyclic graph, and to further abstract the relationships between or among the nodes of the graph into a plurality of graph distance metrics. In order to accomplish a particular graph analysis task, however, it may be advantageous to combine, alter, or otherwise perform derivations and/or calculations on one graph distance metric in order to generate another. For example, as described in more detail below and with reference to FIGS. 3-7, AT level slack and RAT level slack—themselves second order graph distance metrics—may be derived from other, abstracted second order graph distance metrics. The use of a particular graph distance metric may depend on the particular timing analysis task to which a timing analysis tool is put.

In some embodiments, second order graph distance metric (205) may include data values and/or data structures associated with one or more second order graph distance metrics. Second order graph distance metric (205) may be stored as one or more data elements and/or data structures in RAM (168) of example computer (152).

The example method illustrated in FIG. 2 also includes scheduling (206) a timing calculation for a set of nodes of the input netlist based at least on the second order graph distance metric. For example, in order to analyze the timing of a circuit model, it may be advantageous to perform timing calculations for certain nodes prior to performing the timing calculations for other nodes, as described in more detail below with reference to FIGS. 3-7. Among other benefits, this may allow for an increase in parallel processing of the timing analysis, reducing the amount of time required to perform an overall analysis of the circuit model. For example, in order to identify a node that will require a greater length of time for its analysis, one or more second order graph distance metrics may be used.

Identifying a difference in the analysis time for different nodes is a preliminary step in identifying efficiencies and optimizations in circuit timing analysis. As described in more detail below with reference to FIGS. 3-7, these efficiencies and optimizations may include: incremental timing (e.g., only processing/analyzing nodes that are needed or desired for a particular timing path, and improving the identification of needed or desired nodes), dynamic scheduling (e.g., prioritizing in a schedule those nodes based on the amount of analysis required. This may include, for example, identifying a node with a number of successor nodes that also each require a larger amount of analysis), identification of optimization groups for parallel processing, etc.

For example, with regard to incremental timing, certain current timing analyses assume an AT level slack of zero during queue processing. This may be improved through the use of second order graph distance metrics. For example, given a first node T and a potential node Q from the queue, a current analysis may process Q only if the AT level for Q is less than the AT level for T. Using second order graph distance metrics, this may be altered to process Q only if the addition of the AT level for Q and the AT level slack for Q is less than the AT level for T (in instances where Q and T are not equal). This may improve the management of the queue by better prioritizing the nodes in the queue.

In some embodiments, scheduling (206) may result in the generation of timing calculation schedule (207). Timing calculation schedule (207) may include data values and/or data structures associated with a schedule for timing calculations to be done on one or more of the nodes in the input netlist. Timing calculation schedule (207) may be stored as one or more data elements and/or data structures in RAM (168) of example computer (152).

Figure 3:
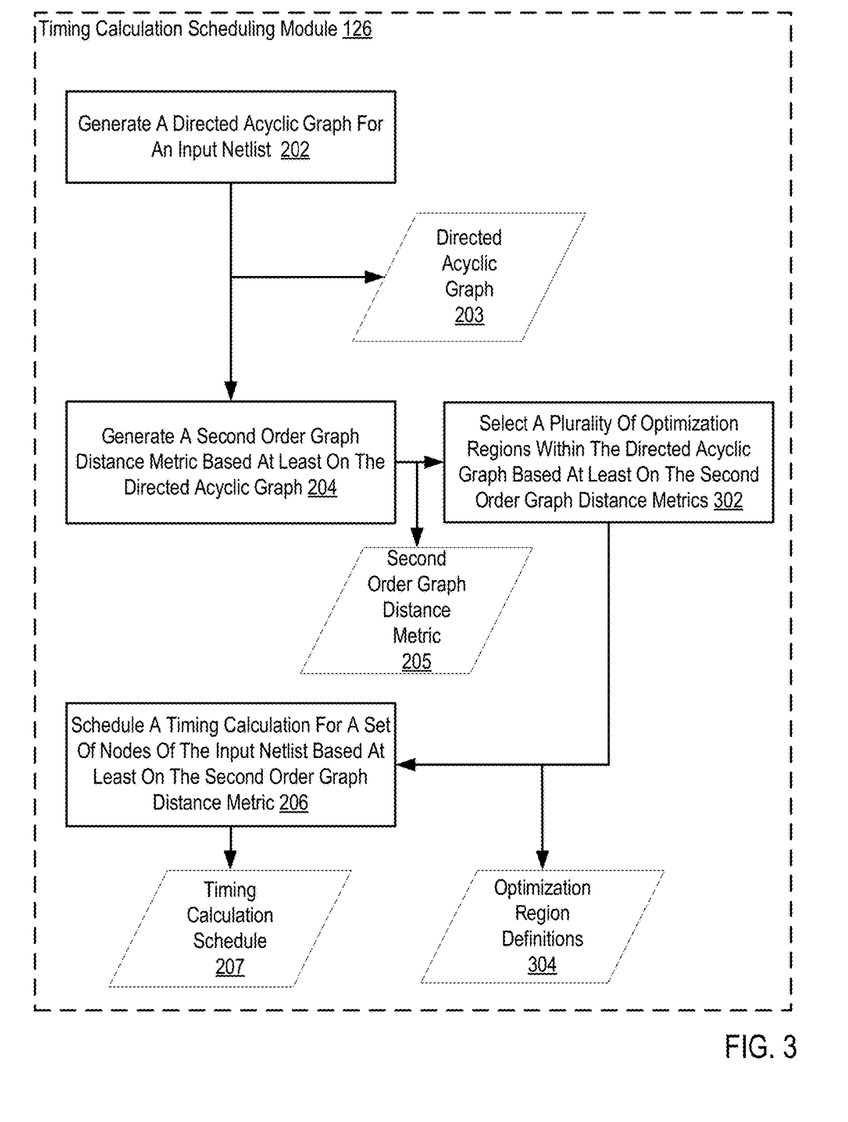
FIG. 3 sets forth a flow chart illustrating a further exemplary method for improving automated timing analysis, in accordance with certain embodiments of the present disclosure.

For further explanation, FIG. 3 sets forth a flow chart illustrating a further exemplary method for improving automated timing analysis, in accordance with certain embodiments of the present disclosure. In some embodiments, the example method illustrated in FIG. 3 includes selecting (302) a plurality of optimization regions within the directed acyclic graph based at least on the second order graph distance metrics. As described in more detail above and below with reference to FIGS. 4-7, certain second order graph distance metrics (e.g., AT slack, RAT slack, etc.) may be used to select a plurality of optimization regions with the acyclic graph. As noted above, one of the advantages of second order graph distance metrics is that they may allow identification of nodes for which analysis may take longer than the analysis of other nodes. More generally, it may allow for identification of groups of nodes with similar analysis times and/or the dependencies between or among nodes. This may allow one of ordinary skill in the art to identify groups of nodes and/or timing points that may be processed in parallel.

In some embodiments, selecting (302) may result in the generation of optimization region definitions (304). Optimization region definitions (304) may include data values and/or data structures associated with one or more optimization regions composed of one or more nodes in the input netlist. Optimization region definitions (304) may be stored as one or more data elements and/or data structures in RAM (168) of example computer (152).

Figure 4:
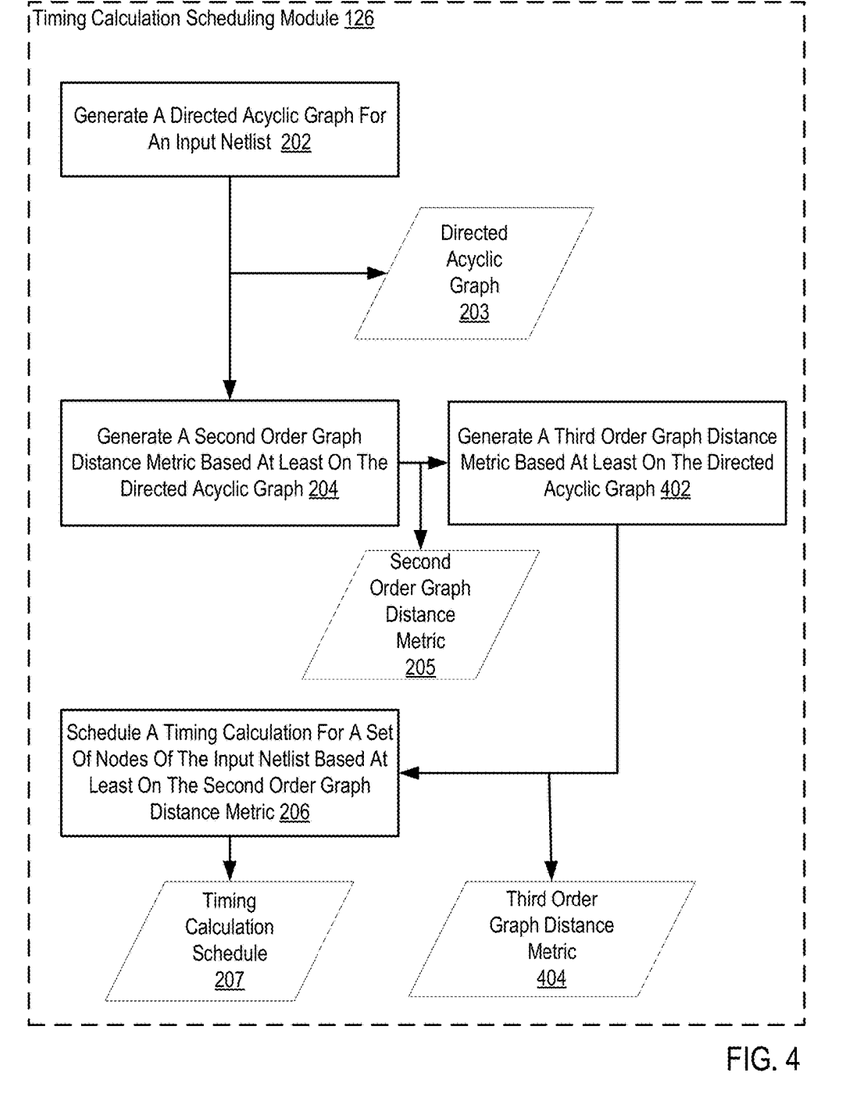
FIG. 4 sets forth a flow chart illustrating a second further exemplary method for improving automated timing analysis, in accordance with certain embodiments of the present disclosure.

For further explanation, FIG. 4 sets forth a flow chart illustrating a second further exemplary method for improving automated timing analysis, in accordance with certain embodiments of the present disclosure. In some embodiments, the example method illustrated in FIG. 4 includes generating (402) a third order graph distance metric based at least on the directed acyclic graph. As described in more detail above and below with reference to FIGS. 5-7, certain second order graph distance metrics (e.g., AT slack, RAT slack, etc.) may be useful in optimizing a timing analysis of a circuit model. As second order graph distance metrics may arise from first order graph distance metrics, so may still higher order graph distance metrics arise from orders below. For example, a plurality of third order graph distance metrics may be calculated and/or derived from one or more second order graph distance (and further one or more first order graph distance metrics). For example, as described in more detail below, an AT level slack may be derived from a minimizing function applied to a second order graph distance metric. Analogous metrics may be constructed from minimizing, maximizing, and/or other functions applied to second order graph distance metrics. For example, once a plurality of optimization regions have been identified, further optimization may be possible. As described in more detail below with reference to FIGS. 5-7, one example second order graph distance metric may be determined that is associated with a minimum of distances of successor nodes of a node T ("successors of T" or "suc(T)") from a source node S. This may be denoted as illustrated below in Formula 3.

$$d_2(S,T)=\text{MIN}[d(S,suc(T))] \quad \text{Formula 3}$$

If such a second order graph distance metric is determined for each of a plurality of optimization regions, then a third order graph distance metric may be constructed minimizing (or maximizing) this metric for a set of optimization regions. This third order graph distance metric may then be used in scheduling (206) a timing calculation. In such a configuration, scheduling (206) a timing calculation may make use of the third order graph distance metric by scheduling optimization regions for appropriate parallel processing.

In some embodiments, generating (402) may result in the generation of third order graph distance metric (404). Third order graph distance metric (404) may include data values and/or data structures associated with one or more third order graph distance metrics. Third order graph distance metric (404) may be stored as one or more data elements and/or data structures in RAM (168) of example computer (152).

For further explanation, FIG. 5 illustrates an example directed acyclic graph (500), in accordance with certain embodiments of the present disclosure. Example directed acyclic graph (500) may aid in understanding certain example first- and second order graph distance metrics described in more detail above with reference to FIGS. 1-4.

Directed acyclic graph (500) includes a plurality of source nodes (502) and a plurality of sink nodes (504). For ease of discussion, three source nodes (502) and two sink nodes (504) are illustrated, although more, fewer, or different nodes may be implemented in any given configuration without departing from the scope of the present disclosure. The example source nodes (502) are denoted as node "A," "B," and "C." The example sink nodes (504) are denoted as nodes "X" and "Y."

Directed acyclic graph (500) also indicated example paths from each of the source nodes (502) to the appropriate sink node (504). For example, there is a path from A to X, from B to X, from B to Y, and from C to Y. For the purposes of all illustrations, it is assumed that each edge in the directed acyclic graph is equivalent to the same unit of weight (e.g., a unit delay in a timing graph). As described in more detail above with reference to FIGS. 2-4, a given source node (502) may have an associated AT level. For example, node A may have an AT level of 10, node B an AT level of 5, and node C an AT level of 7. Additionally, each sink node (504) may have an associated AT level.

The AT level at a sink node may be determined from the maximum of the AT levels of all nodes with paths incoming to that sink node (504) plus one. For example, using the example values above, node X would have an AT level of 11 (e.g., MAX (10,5)+1). Node Y would have an AT level of 8 (e.g., MAX (7,5)+1). The AT levels at the various nodes may then be used to determine an AT level slack for each node.

As described above with reference to Formula 1, then, the AT level slack for each edge can be constructed. The example values provided above can be applied to Formula 1 to produce the example values provided below in Table 1.

TABLE 1

| AT Level Slack$_{EDGE}$ (Source, Sink) | Value |
|---|---|
| AT Level Slack (A, X) | 0 |
| AT Level Slack (B, X) | 5 |
| AT Level Slack (B, Y) | 2 |
| AT Level Slack (C, Y) | 0 |

Once the AT level slack is determined for each edge, an AT level slack may then be determined for each sink node (504). One method to calculate the AT level slack for a node is described in more detail above with reference to Formula 2. Applying Formula 2 to the example values above provides the example values below in Table 2.

TABLE 2

| AT Level Slack$_{NODE}$ (Node) | Value |
|---|---|
| AT Level Slack (A) | 0 |
| AT Level Slack (B) | 2 |
| AT Level Slack (C) | 0 |

By comparing the AT level slack values for source nodes (502), an optimized schedule of timing analysis may be constructed. That is, an AT level slack value can indicate the difference in analysis requirements for different nodes. For example, using the example values above in Table 1, node B has an AT level slack value of 2. For the purposes of this disclosure, numerical values are assumed to have a unit value equal to the unit value represented by an edge or path in the directed acyclic graph. The positive AT level slack value indicates that the analysis for node B may be deferred. Therefore, in order to analyze the timing at a sink node, the various source nodes may be scheduled for analysis based at least partly on the relative AT level slack values.

Figure 6:
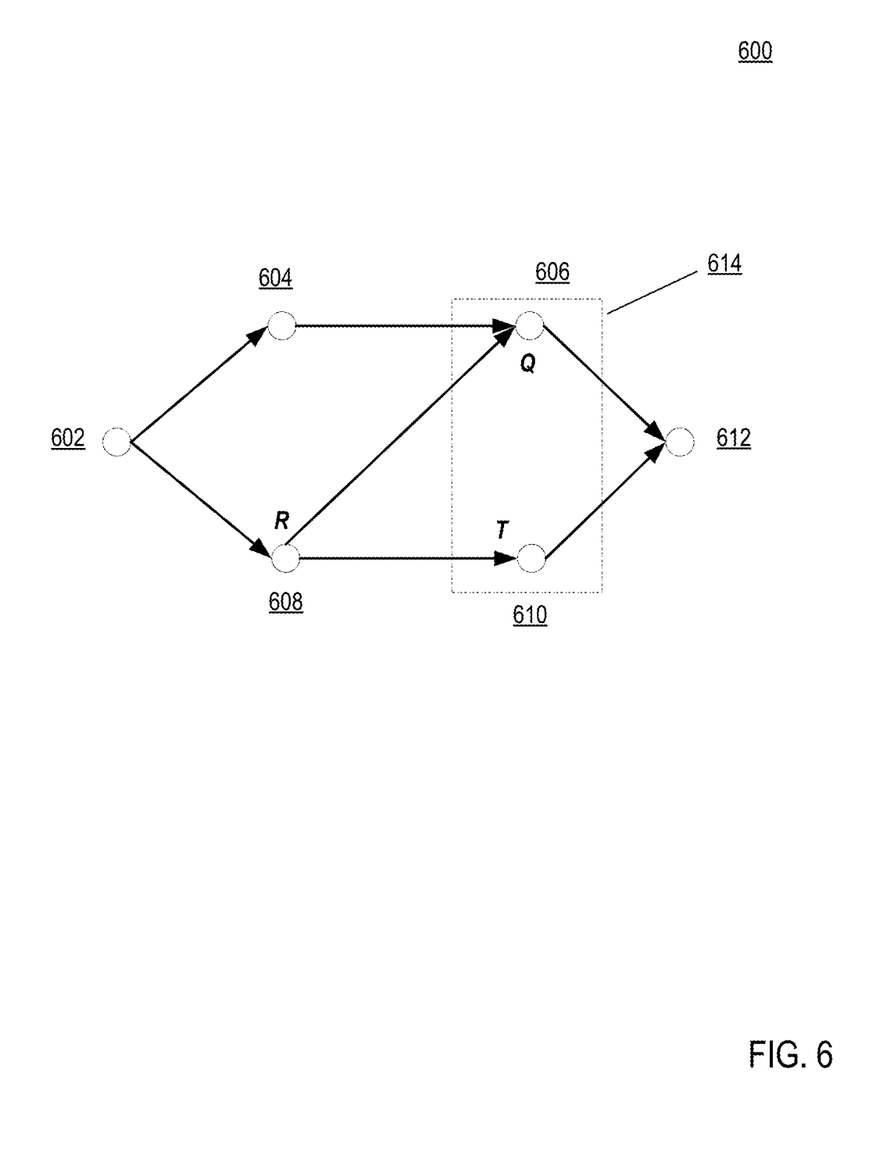
FIG. 6 illustrates a second example directed acyclic graph, in accordance with certain embodiments of the present disclosure.

For further explanation, FIG. 6 illustrates a second example directed acyclic graph (600), in accordance with certain embodiments of the present disclosure. Example directed acyclic graph (600) includes one source node (602), one sink node (612), and a plurality of intermediate nodes (604, 606, 608, 610). The paths between source node (602) and sink node (612) may take a plurality of paths through nodes (604, 606, 608, 610). These paths may branch from one intermediate node to a plurality of other intermediate nodes. For example, node (608) may take a path to sink node (612) via either node (606) or node (610). In this sense, nodes (606, 610) may be referred to as the "successors" of node (608). Region (614) illustrates the groups of successors to node (608). Analogously, nodes (604, 608) both have paths leading to node (606). Thus, nodes (604, 608) may be referred to as the "predecessors" of node (606).

As described in more detail above with reference to FIGS. 1-4, various graph distance metrics may be constructed relating to directed acyclic graph (600). For example, a first order distance metric may include the maximum distance of a node from source node (602), and a second order distance metric may include the maximum distance of a node from sink node (612). If the node in question is denoted as node "T," then these metrics may be respectively denoted as d(S,T) and d(F,T). These metrics, in turn, are one way to define the AT level and RAT level, respectively for node T.

These first order graph distance metrics may be used to, among other things, detect timing dependencies. As an illustrative example, consider two "target" nodes: node (606) denoted as "Q" and node (610) denoted as "T." If d(S,T)<=d(S,Q), then T cannot depend on Q. Likewise, if d(F,T)>=d(F,Q), then T cannot depend on Q.

In addition to various first order graph distance metrics, second order graph distance metrics may also be constructed. For example, now consider node (608) denoted as "R." As described above, node R (608) may have associated therewith first order distance metrics d(S,R) and d(F,R) (e.g., the maximum distance from the source node to R and from R to the sink node, respectively). Additionally, node R (608) may have one or more successor nodes. Region (614) illustrates the successor nodes to node R (608): nodes Q (606) and T (610). These may be collectively referred to as "suc(R)." Analogously, any predecessor nodes to node R (608) may be denoted as "pre(R)."

A second order graph distance metric may then be constructed for node R (608). The first example second order graph distance metric determines the minimum of distances of successors of node R (608) from source node S (602). This may be denoted as "$d_2(S,R)$," and is illustrated by Formula 4 below.

$$d_2(S,R)=\mathrm{MIN}[d(S,suc(R))] \quad \text{Formula 4}$$

This second order graph distance metric, the minimum distance of successors metric, is another way to determine an AT level slack metric for a particular node. Another example second order graph distance metric may determine the minimum distance of predecessors of node R (608) from sink node F (612). This may be denoted as "$d_2(F,R)$," and is illustrated by Formula 5 below.

$$d_2(F,R)=\mathrm{MIN}[d(F,pre(R))] \quad \text{Formula 5}$$

As noted by Formulas 4-5, these second order graph distance metrics utilize a minimum formulation in their construction. Utilizing a maximum formulation may result in other second order graph distance formulas that may be useful in scheduling timing analyses. Still other second order graph distance metrics may be constructed without departing from the scope of the present disclosure. Further, as described in more detail above with reference to FIG. 4, higher order graph distance metrics may be constructed.

Figure 7:
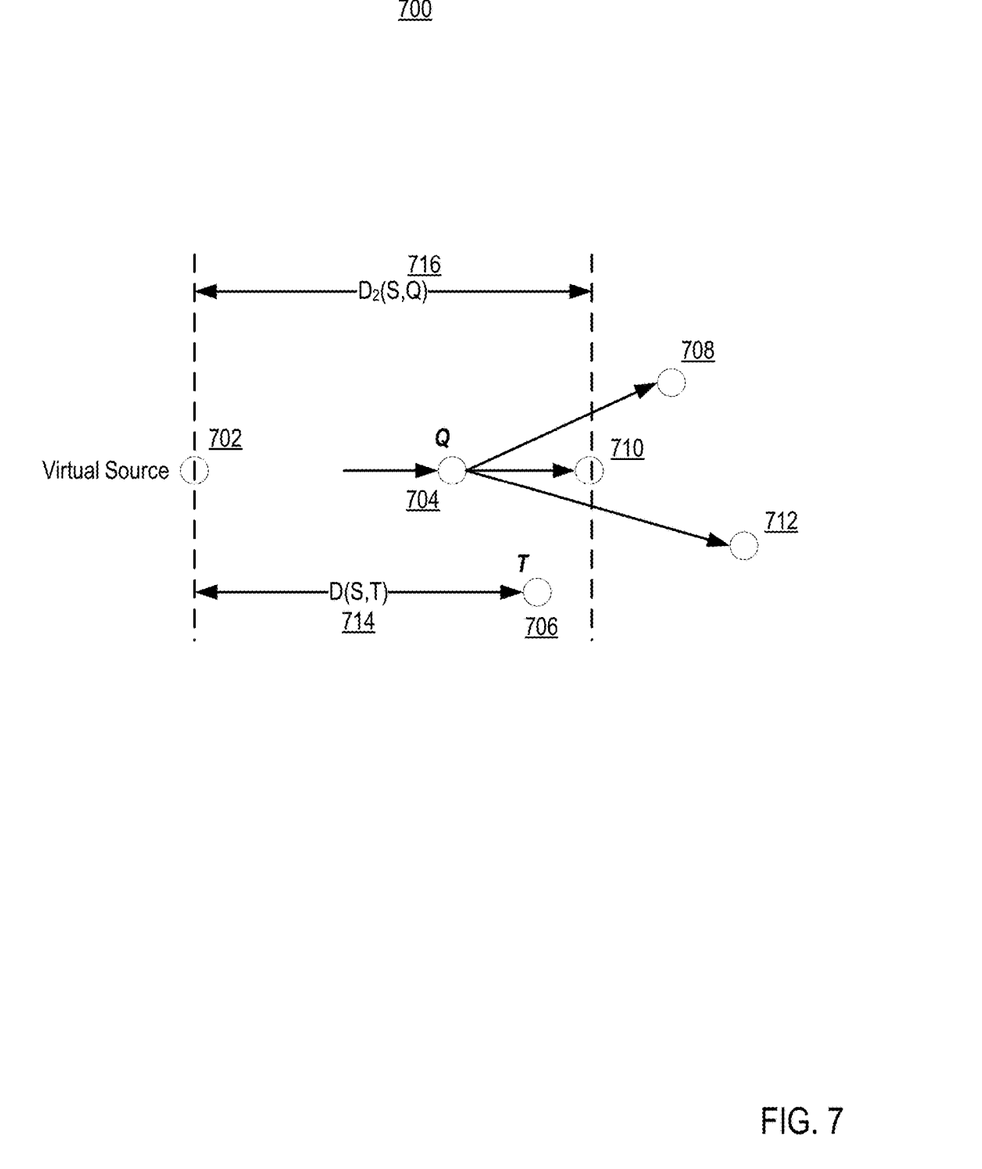
FIG. 7 illustrates a third example directed acyclic graph, in accordance with certain embodiments of the present disclosure.

As described in more detail above with reference to FIGS. 1-5 and below with reference to FIG. 7, second order graph distance metrics may then be used in order to detect timing dependencies and aid in scheduling timing analyses. For further explanation, FIG. 7 illustrates a third example directed acyclic graph (700), in accordance with certain embodiments of the present disclosure.

In some embodiments, example directed acyclic graph (700) includes a virtual source node (702), as well as various subsequent nodes (704, 706, 708, 710, 712). Virtual source node (702) may be considered as a modeled or abstracted reference point by which timing dependencies for subsequent nodes may be determined. That is, in order to determine timing dependencies for nodes, it may not be necessary to identify the particular source node for a particular timing path.

Example directed acyclic graph (700) also includes two nodes: node Q (704) and node (T) for which a timing analysis tool may analyze as timing points. As illustrated in FIG. 7, node Q (704) also includes successor nodes (708, 710, 712). As with all example acyclic graphs, although a certain number, type, and topology of nodes are illustrated to aid in understanding, more, fewer, and/or different types of nodes may be present without departing from the scope of the present disclosure.

Example directed acyclic graph (700) also indicates a second order graph distance metric, $D_2(S,Q)$ (716), and a first order graph distance metric, $D(S,T)$ (714). As described in more detail above with reference to FIG. 6, second order graph distance metric (716) indicates the minimum distance from a source (e.g., virtual source node (702)) to the successors of node Q (704). By analyzing second order graph distance metric (716) and first order distance metric (714), timing dependencies may be identified. For example, if first order distance metric (714) is less than second order distance metric (716) (and the two nodes referenced are not identical), then node T (706) cannot depend on node Q (704). That is, if node T (706) depends on node Q (704), then node T (706) should be at least as far from virtual source (702) as one of the successors of node Q (704).

As illustrated in FIG. 7, the complete timing path for nodes T (706) and Q (704) need not be known in order to determine a timing dependency. All that is needed in order to determine the dependency is knowledge of second order graph distance metric (716) and first order graph distance metric (714).

As an additional example of using knowledge of the graph distance metrics, consider again the example values described above in more detail above with reference to FIG. 5 and Tables 1-2. In order to determine whether node B depends on node C, calculations based on the AT levels and AT level slacks of nodes B and C can be compared. For example, if the AT level of a first node, combined with the AT level slack of that first node, is less than the AT level of a second node, then the second node does not depend on the first node, as illustrated by Formula 6 below.

IF $\{\text{ATLevel}(B)+\text{ATLevelSlack}(B)<\text{ATLevel}(C)\}$,
THEN $\{C \notin \text{dependents}(B)\}$  Formula 6

Using the example values of FIG. 5 and Tables 1-2 in order to determine whether node B depends on node C, node C may be identified as not depending on node B. As noted in the illustrative example above, the AT level for node B is 5, the AT level slack for node B is 2, and the AT level for node C is 7. Since the combination of the AT level and AT level slack for node B is not less than the AT level for node C, then node C cannot depend on node B. Even though node C is at a higher AT level, using the graph distance metrics, one may identify the dependencies for node B.

The example second order graph distance metrics described in more detail above may be considered abstracted distance metrics. However, the AT level slack metric discussed may also be determined from these metrics. For example, if the AT level slack for a node T is defined as the minimum of the AT level slack of all outgoing edges from node T, then this equation may be expanded as illustrated by Formula 7 below.

ATLevelSlack(T)=MIN[ATLevelSlack(OutgoingEdgesOfT)]

ATLevelSlack(T)=MIN[ATLevel(suc(T)−ATLevel(T)+1)]

ATLevelSlack(T)=MIN[ATLevel(suc(T))]−ATLevel(T)+1

ATLevelSlack(T)=MIN[d(suc(T))]−d(S,T)+1  Formula 7

As indicated, second order graph distance metrics may be constructed to identify timing dependencies and other potential efficiencies for scheduling a timing analysis for a circuit, in accordance with certain embodiments of the present disclosure. This may be used, for example, by an automated timing analysis tool to implement efficiencies in timing analysis. This may include: incremental timing (e.g., deciding which timing points affect a target timing point, etc.), dynamic scheduling in parallel timing (e.g., estimating an amount of work generated by processing a selected timing point, eliminating bottle necks by identifying a timing point with successors having too many predecessors, flattening a propagation wavefront by prioritizing timing points with the longest distance to a sink, etc.), circuit optimization (e.g., selecting independent optimization regions or timing points for processing in parallel, etc.), and incremental abstraction (e.g., allowing flexibility in scheduling inputs of various AT levels), among other possibilities.

In some embodiments, the methods, apparatuses, and products may improve automated timing analysis in a variety of ways, including those described in more detail above with reference to FIGS. 1-7. In addition, automated timing analysis may be improved through the introduction of dynamic scheduling. In certain known processes, a list of ready-to-process tasks may be maintained. There may be extant more ready-to-process tasks than there are threads available. In certain known processes, scheduling of these ready-to-process tasks may be relatively arbitrary.

In certain embodiments of the present disclosure, scheduling may be prioritized based on an amount of new work that can be generated. For example, a ready-to-process task may have one or more successor(s), which can be identified as described in more detail above. Additionally, each ready-to-process task will have a predecessor count ("PC") of at least one. Accordingly, a metric may be formulated for work that can be generated on measuring PC, AT level slack, and RAT level slack for each successor node (and successor edge) of a candidate task.

As an illustrative example, if "C" is a candidate task from a ready-to-process queue, and {C,S} is a successor edge from C to a successor sink node "S," then "work resistance" of {C,S} ("WR{C,S}") may be defined as illustrated below in Formula 8. As illustrated in Formula 8, if PC(S) (that is, the predecessor count of the sink node) is one, then scheduling C may guarantee S is ready to process. However, if PC(S) is greater than one, then "work resistance" to scheduling increases. Work resistance will correspondingly increase as PC(S) increases. The more outstanding tasks left to perform in order for a sink node to be considered fully ready to process, the greater the work resistance. Similarly, work resistance will increase when the edge level slack from C to S increases. A large edge level slack implies a relatively lower likelihood that a wavefront of work in flight has caught up to predecessors of S.

$WR\{C,S\}=(PC(S)-1)*\text{LevelSlack}_{EDGE}(C,S)$  Formula 8

Another example metric that may be generated is "work potential" of {C,S} ("WP{C,S}"). As illustrated in Formula 9 below, work potential may be used to identify the likelihood that node S will be ready relatively soon. As illustrated in Formula 9, if the work potential is one, then scheduling of C will guarantee that S will be ready to process. However, if the work potential is less than one, then node S will not yet be ready to process upon completion of node C. Further, the lower the value of the work potential of the edge, the less likely that node S will be ready relatively soon.

$WP\{C,S\}=1/(1+WR\{C,S\})$  Formula 9

The work potential for a node (e.g., WP(C)) may then be determined by integrated the work potential of all successor edges of the node. A priority queue of ready-to-process tasks may then be sorted by the work potential for that task, such that whenever a thread becomes available, the task with the largest work potential may be dispatched for execution.

Exemplary embodiments described herein are described largely in the context of a fully functional computer system for improving automated timing analysis. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments without departing from its true spirit. The descriptions in this specification are for purposes of illustration only and are not to be construed in a limiting sense. The scope of the present disclosure is limited only by the language of the following claims.

What is claimed is:

1. A method of improving automated timing analysis, the method comprising:
    generating a directed acyclic graph for an input netlist, the input netlist comprising a list of terminals of electronic components ("nodes") in a circuit and a list of electrical conductors ("edges") that interconnect the nodes, the directed acyclic graph comprising nodes of the netlist arranged in an acyclic manner to indicate the nature of edges among the nodes;
    generating a second order graph distance metric based at least on the directed acyclic graph;
    scheduling a timing calculation for a set of nodes of the input netlist based at least on the second order graph distance metric;
    generating a work resistance for each of a plurality of edges from a node to a plurality of successor nodes based at least on the second order graph distance metric;
    generating a work potential for each of the plurality of edges based at least on the work resistance;
    generating a work potential for the node based at least on the work potential for each of the plurality of edges; and
    scheduling a task based at least on the work potential for the node.

2. The method of claim 1 wherein the second order graph distance metric comprises an arrival time level slack metric.

3. The method of claim 1 wherein scheduling the timing calculation further comprises identifying a node from the set of nodes for which a distance from the node to a sink associated with the node is longest.

4. The method of claim 1 wherein scheduling the timing calculation further comprises estimating a processing time for a node from the set of nodes based at least on the second order graph distance metric.

5. The method of claim 1, further comprising selecting a plurality of optimization regions within the directed acyclic graph based at least on the second order graph distance metrics, and wherein scheduling the timing calculation further comprises processing the plurality of optimization regions in parallel.

6. An apparatus for improving automated timing analysis, the apparatus comprising a computer processor and a computer memory operatively coupled to the computer processor, the computer memory having disposed within it computer program instructions capable of:
    generating a directed acyclic graph for an input netlist, the input netlist comprising a list of terminals of electronic components ("nodes") in a circuit and a list of electrical conductors ("edges") that interconnect the nodes, the directed acyclic graph comprising nodes of the netlist arranged in an acyclic manner to indicate the nature of edges among the nodes;
    generating a second order graph distance metric based at least on the directed acyclic graph;
    scheduling a timing calculation for a set of nodes of the input netlist based at least on the second order graph distance metric;
    generating a work resistance for each of a plurality of edges from a node to a plurality of successor nodes based at least on the second order graph distance metric;
    generating a work potential for each of the plurality of edges based at least on the work resistance;
    generating a work potential for the node based at least on the work potential for each of the plurality of edges; and
    scheduling a task based at least on the work potential for the node.

7. The apparatus of claim 6 wherein the second order graph distance metric comprises an arrival time level slack metric.

8. The apparatus of claim 6 wherein scheduling the timing calculation further comprises identifying a node from the set of nodes for which a distance from the node to a sink associated with the node is longest.

9. The apparatus of claim 6 wherein scheduling the timing calculation further comprises estimating a processing time for a node from the set of nodes based at least on the second order graph distance metric.

10. The apparatus of claim 6, further comprising selecting a plurality of optimization regions within the directed acyclic graph based at least on the second order graph distance metrics, and wherein scheduling the timing calculation further comprises processing the plurality of optimization regions in parallel.

11. A computer program product for improving automated timing analysis, the computer program product disposed upon a non-transitory computer readable medium, the computer program product comprising computer program instructions capable, when executed, of causing a computer to carry out the steps of:
    generating a directed acyclic graph for an input netlist, the input netlist comprising a list of terminals of electronic components ("nodes") in a circuit and a list of electrical conductors ("edges") that interconnect the nodes, the directed acyclic graph comprising nodes of the netlist arranged in an acyclic manner to indicate the nature of edges among the nodes;
    generating a second order graph distance metric based at least on the directed acyclic graph;
    scheduling a timing calculation for a set of nodes of the input netlist based at least on the second order graph distance metric;
    generating a work resistance for each of a plurality of edges from a node to a plurality of successor nodes based at least on the second order graph distance metric;
    generating a work potential for each of the plurality of edges based at least on the work resistance;
    generating a work potential for the node based at least on the work potential for each of the plurality of edges; and
    scheduling a task based at least on the work potential for the node.

12. The computer program product of claim 11 wherein the second order graph distance metric comprises an arrival time level slack metric.

13. The computer program product of claim 11 wherein scheduling the timing calculation further comprises identifying a node from the set of nodes for which a distance from the node to a sink associated with the node is longest.

14. The computer program product of claim 11 wherein scheduling the timing calculation further comprises estimating a processing time for a node from the set of nodes based at least on the second order graph distance metric.

15. The computer program product of claim 11, further comprising selecting a plurality of optimization regions within the directed acyclic graph based at least on the second order graph distance metrics, and wherein scheduling the timing calculation further comprises processing the plurality of optimization regions in parallel.

\* \* \* \* \*